(12) United States Patent
Sakanaka

(10) Patent No.: US 6,335,811 B1
(45) Date of Patent: Jan. 1, 2002

(54) OPTICAL SPACE COMMUNICATION APPARATUS

(75) Inventor: Tetsuo Sakanaka, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/175,969

(22) Filed: Oct. 21, 1998

(30) Foreign Application Priority Data

Oct. 24, 1997 (JP) .............................................. 9-309790

(51) Int. Cl.[7] .............................................. H04B 10/00
(52) U.S. Cl. ........................ 359/159; 359/152; 359/153
(58) Field of Search .................. 359/152, 153, 359/159

(56) References Cited

U.S. PATENT DOCUMENTS

| | | | | |
|---|---|---|---|---|
| 5,065,455 A | * | 11/1991 | Ito et al. | 359/159 |
| 5,142,400 A | * | 8/1992 | Solinsky | 359/159 |
| 5,329,395 A | * | 7/1994 | Endo et al. | 359/159 |
| 5,465,170 A | * | 11/1995 | Arimoto | 359/159 |
| 5,500,754 A | | 3/1996 | Orino et al. | 359/156 |
| 5,530,577 A | | 6/1996 | Orino et al. | 359/152 |
| 5,545,962 A | * | 8/1996 | Wakui | 318/677 |
| 5,594,580 A | * | 1/1997 | Sakanaka et al. | 359/172 |
| 5,610,748 A | | 3/1997 | Sakanaka et al. | 359/154 |
| 5,627,669 A | | 5/1997 | Orino et al. | 359/156 |
| 5,680,241 A | | 10/1997 | Sakanaka et al. | 359/172 |
| 5,684,614 A | * | 11/1997 | Degura | 359/172 |
| 5,689,354 A | * | 11/1997 | Orino | 359/172 |
| 5,786,923 A | * | 7/1998 | Doucet et al. | 359/172 |
| 5,794,078 A | * | 8/1998 | Okazaki | 396/50 |
| 5,867,294 A | * | 2/1999 | Sakai | 359/172 |

* cited by examiner

Primary Examiner—Leslie Pascal
Assistant Examiner—Hanh Phan
(74) Attorney, Agent, or Firm—Fitzpatrick, Cella, Harper & Scinto

(57) ABSTRACT

In an optical space communication apparatus, a first electrical signal is converted into a first optical signal, and the first optical signal is transmitted to a partner apparatus in the form of a first light beam. A second light beam transmitted from the partner apparatus is received to thereby detect a second optical signal by a photodetector of the optical space communication apparatus. The second optical signal is converted into a second electrical signal. A transmission direction of the first light beam and reception direction of the second light beam are changed in a direction to maximize an intensity of the second electrical signal obtained by converting the second optical signal detected by the photodetector.

6 Claims, 7 Drawing Sheets

OPTICAL SPACE COMMUNICATION APPARATUS

BACKGROUND OF THE INVENTION

1. Field of the Invention

The present invention relates to an optical space communication apparatus for making optical wireless communications between two distant places using a light beam.

2. Related Background Art

FIG. 1 shows the arrangement of a conventional optical space communication apparatus with an automatic tracking function. A light transmission/reception lens system 1 and movable mirror 2 are placed at a position opposing the partner apparatus, and a polarization beam splitter 3, transmission optical system 4, and semiconductor laser light-emitting element 5 are placed in turn in the incoming direction of the movable mirror 2. In the reflection direction of the polarization beam splitter 3, a beam splitting mirror 6, reception optical system 7, and 4-split photodetector 8 are placed. In the reflection direction of the beam splitting mirror 6, a reception optical system 9 and main signal photodetector 10 are placed.

The output from a multiplexer 11 is connected to the light-emitting element 5. The output from a pilot signal generator 12 for generating a pilot signal of a single frequency lower than that of the main signal for position detection is connected to the multiplexer 11, and the output from a main signal input terminal 14 to the multiplexer 11 via an amplifier 13. The output from the photodetector 10 is connected to a main signal output terminal 16 via an amplifier 15, the output of which is fed back via a detecting circuit 17. The output from the 4-split photodetector 8 is connected to a control circuit 19 via four amplifiers 18a to 18d, and the output from the control circuit 19 is connected to the movable mirror 2 via two movable mirror drivers 20a and 20b. Note that the movable mirror 2 is rotated in two directions about axes perpendicular to and parallel to the plane of paper of FIG. 1.

A main signal to be transmitted input from the input terminal 14 is amplified by the amplifier 13, and is multiplexed with a pilot signal from the pilot signal generator 12 by the multiplexer 11. The main signal is then converted into an optical signal by the light-emitting element 5. The output light coming from the light-emitting element 5 is polarized light, the plane of polarization of which is parallel to the plane of paper of FIG. 1, and is transmitted through the transmission optical system 4 and polarization beam splitter 3. The main signal light is then reflected by the movable mirror 2, and is output from the transmission/reception lens system toward the partner apparatus in the form of a light beam.

On the other hand, a received light beam coming from the partner apparatus enters the transmission/reception lens system 1, is reflected by the movable mirror 2, and then enters the polarization beam splitter 3. In this case, since this received light beam is polarized in a direction perpendicular to the plane of paper, it is reflected by the cemented surface of the polarization beam splitter 3, and travels in the direction of the beam splitting mirror 6. The received light beam is split into two directions by the beam splitting mirror 6. One light beam is reflected by the beam splitting mirror 6, and is focused on the main signal photodetector 10. On the other hand, the other light beam is transmitted through the beam splitting mirror 6, and is focused on the 4-split photodetector 8.

The optical signal is converted into an electrical signal by the main signal photodetector 10, and the electrical signal is amplified by the amplifier 15. The amplified signal is then output as a reception signal from the output terminal 16. At this time, the amplifier 15 receives a signal fed back from the detecting circuit 17 to attain automatic gain control.

Since the 4-split photodetector 8 has a low response speed, it has nearly no sensitivity to the high-frequency main signal, and detects the low-frequency pilot signal alone. A focused beam spot is formed on four photodetection portions 8a to 8d of the 4-split photodetector 8, and the outputs from these photodetection portions 8a to 8d are output to the control circuit 19 after being respectively amplified by the amplifiers 18a to 18d. The control circuit 19 sends drive signals to the movable mirror drivers 20a and 20b on the basis of the signals from the four detection portions 8a to 8d to drive the movable mirror 2, so that the focused beam spot position is located at the center of the 4-split photodetector 8, and outputs from the four detection portions 8a to 8d become equal to each other.

Since the positions of the light-emitting elements 5, 4-split photodetector 8, and main signal photodetector 10 are adjusted in advance to agree with each other on the optical axis, when the beam spot is formed at the center of the 4-split photodetector 8, the light beam is also focused at the central portion of the main signal photodetector 10. At this time, the transmission light beam originating from the light-emitting element 5 is normally output in the direction of the partner apparatus.

In this way, even when the angle of the apparatus has changed due to an external force, such as changes in temperature, and the like, the automatic tracking function effects, by moving, the movable mirror 2 to form the beam spot at the center of the 4-split photodetector 8, thus maintaining a satisfactory communication state without any deviation of the light beam from the direction of the partner apparatus.

However, in the aforementioned prior art, the beam splitting mirror 6 for splitting the received light beam and the 4-split photodetector 8, main signal photodetector 10, and light-emitting element 5 require precise positional adjustment. As a result, the optical system and its holding mechanism are complicated, and adjustments upon assembly become hard. In an electric circuit section, the transmitter requires the pilot signal generator 12 and multiplexer 11, and the receiver requires the amplifiers 18a to 18d corresponding to the photodetection portions 8a to 8d of the 4-split photodetector 8. Furthermore, adjustments for matching the characteristics of the four amplifiers 18a to 18d are required. In this way, the apparatus becomes expensive resulting from the automatic tracking function and its weight and size increase.

SUMMARY OF THE INVENTION

It is an object of the present invention to provide an optical space communication apparatus which can solve the aforementioned problems, can broaden the automatic tracking angular range by a simple arrangement, and has an inexpensive automatic tracking function.

In order to achieve the above object, an optical space communication apparatus according to the present invention is characterized by comprises transmission means for converting a first electrical signal into a first optical signal, and transmitting the first optical signal to a partner apparatus in the form of a first light beam, photodetection means for detecting a second optical signal by receiving a second light beam transmitted from the partner apparatus, and converting the second optical signal into a second electrical signal, and changing means for changing a transmission direction of the first light beam and a reception direction of the second light beam in a direction to maximize an intensity of the second electrical signal obtained by converting the second optical signal detected by the photodetection means.

Especially, the optical space communication apparatus according to the present invention is characterized in that a receivable angular range of the second optical signal is not more than a divergent angle of the first light beam to be transmitted.

DETAILED DESCRIPTION OF THE PREFERRED EMBODIMENTS

An optical space communication apparatus according to the present invention will be described in detail hereinafter on the basis of embodiments illustrated in FIGS. 2 to 10.

Figure 1:
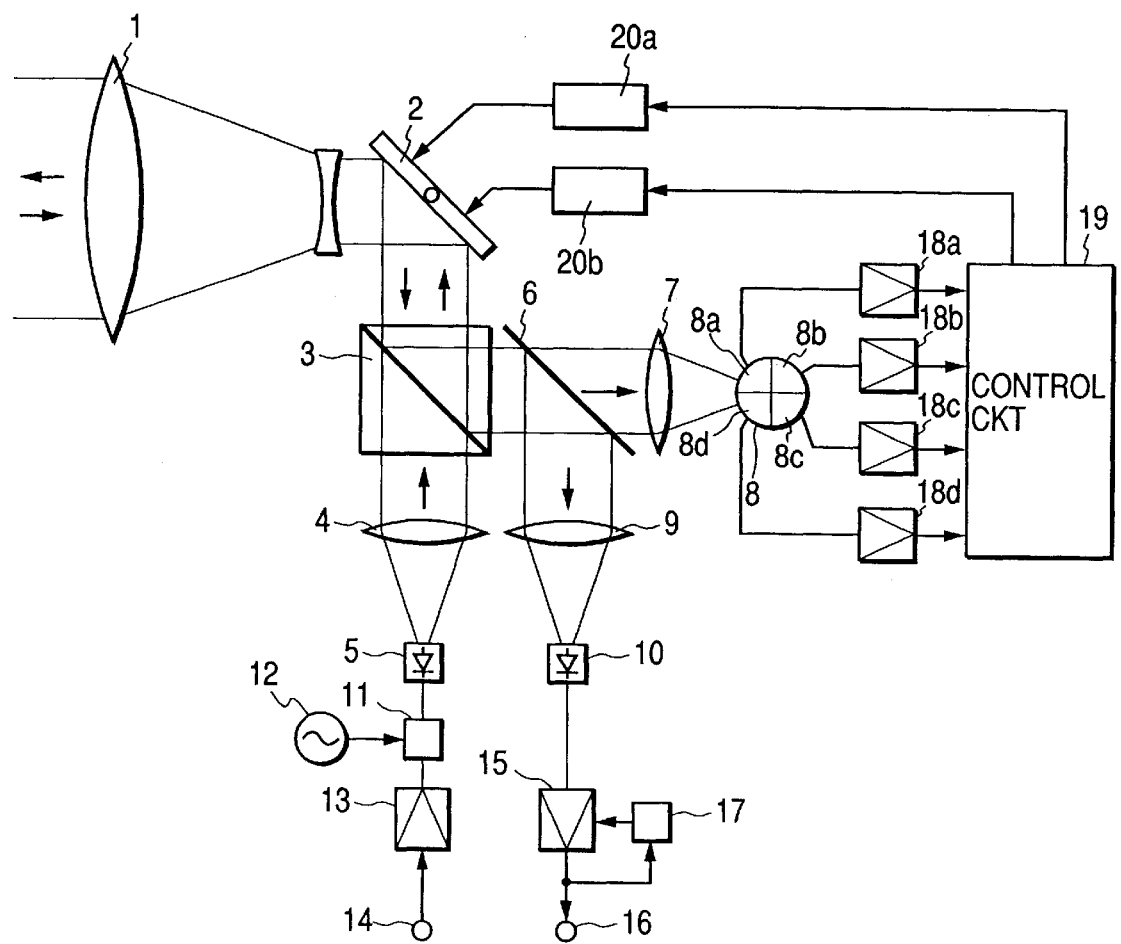
FIG. 1 is a diagram showing the arrangement of a conventional optical space communication apparatus.
Figure 2:
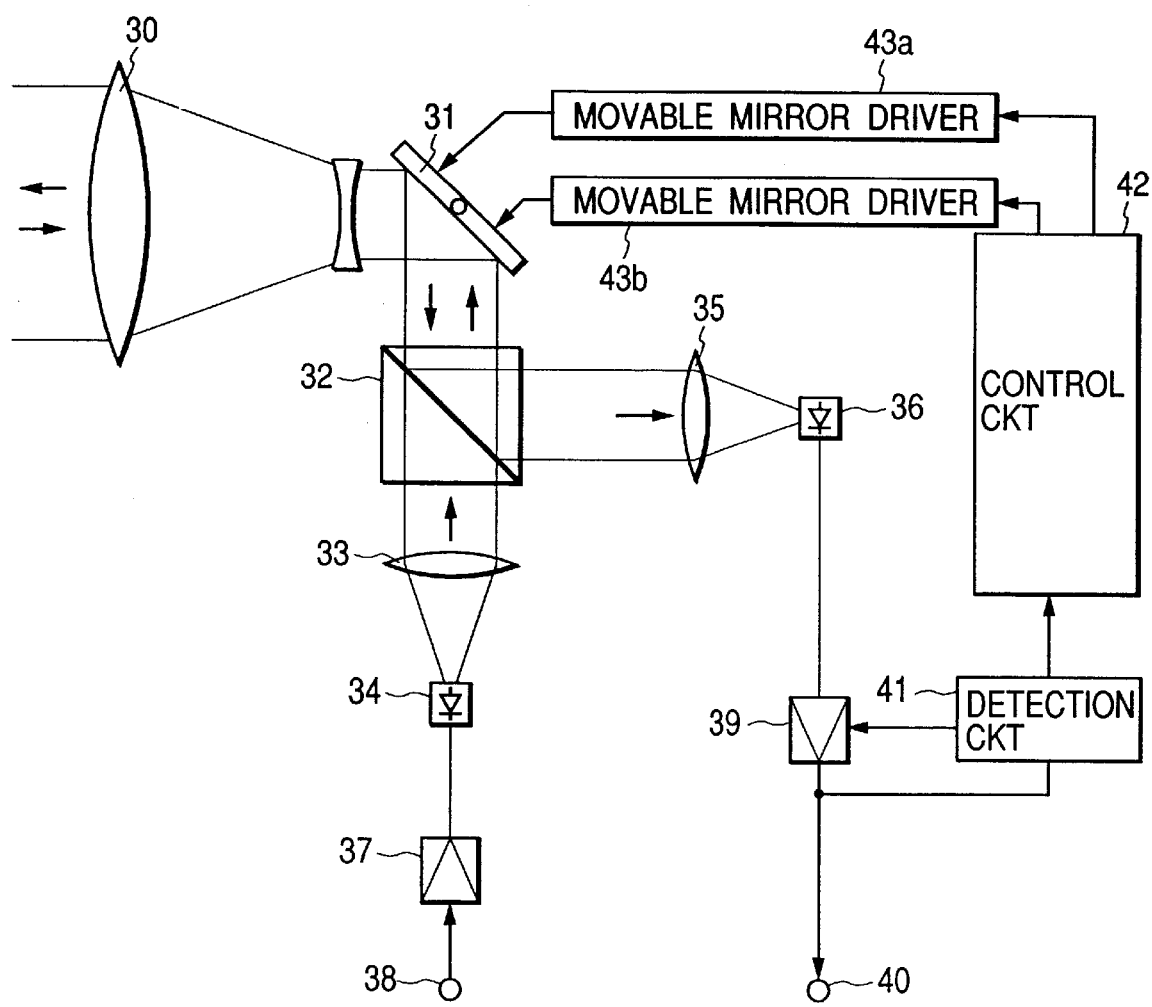
FIG. 2 is a diagram showing the arrangement of an optical space communication apparatus according to the first embodiment of the present invention.

FIG. 2 shows the arrangement of the first embodiment. A light transmission/reception lens system 30 and movable mirror 31 are placed at a position opposing the partner apparatus, and a polarization beam splitter 32, transmission optical system 33, and semiconductor laser light-emitting element 34 are placed in turn in the incoming direction of the movable mirror 31. In the reflection direction of the polarization beam splitter 32, a reception optical system 35 and photodetector 36 are placed.

The output from a transmission signal input terminal 38 is connected to the light-emitting element 34 via an amplifier 37. The output from the photodetector 36 is connected to an reception signal output terminal 40 via an amplifier 39. The output from the amplifier 39 is connected to a control circuit 42 via a detecting circuit 41, the output of which is fed back to the amplifier 39. The output from the control circuit 42 is connected to the movable mirror 31 via two movable mirror drivers 32a and 32b.

A transmission signal is input from the input terminal 38 and is amplified by the amplifier 37. The signal is then converted into an optical signal by the light-emitting element 34, and the optical signal is transmitted through the transmission optical system 33 and polarization beam splitter 33. The optical signal is output to the partner apparatus in the form of a light beam via the movable mirror 31 and transmission/reception lens system 30.

On the other hand, a received light beam coming from the partner apparatus is input via the transmission/reception lens system 30, and is reflected by the movable mirror 31, and the cemented surface of the polarization beam splitter 32. After that, the received light beam is focused on the main signal photodetector 36 by the reception optical system 35. An electrical signal, which is converted from the optical signal by the photodetector, is amplified by the amplifier 39, and is then output as a reception signal from the output terminal 40. A signal output from the detecting circuit 41 is input to the control circuit 42 and is used for detecting the reception power. The control circuit 42 sends drive signals to the movable mirror drivers 43a and 43b on the basis of the input signal. At the same time, the output signal from the detecting circuit 41 is used in automatic gain control of the amplifier 39.

In this embodiment, the reception directivity angle as the receivable angular range of an optical signal sent from the partner apparatus is set to be smaller than the divergent angle of the transmission light beam. For example, when the focal length f of the reception optical system 35 is 200 mm and the diameter d of the detection portion of the photodetector 36 is 0.2 mm, the reception directivity angle is around 0.029° from $\pm\tan^{-1}(d/2f)$. On the other hand, when the distance L of the transmission light beam is 1,000 m, and the beam diameter D at that position is 2 m, the divergent angle is around 0.057° from $\pm\tan^{-1}(D/2L)$.

In order to attain automatic tracking, a transmission light beam from the main apparatus must reach the partner apparatus, and a transmission light beam from the partner apparatus must also reach the main apparatus.

When the divergent angle of the transmission light beam is smaller than the reception directivity angle, the transmission light beam from the main apparatus does not always reach the partner apparatus even when the main apparatus receives the transmission light beam from the partner apparatus.

Conversely, when the reception directivity angle is smaller than the divergent angle of the transmission light beam, if the angle of the main apparatus is adjusted to receive the transmission light beam from the partner apparatus, the transmission light beam from the main apparatus can surely reach the partner apparatus in that state.

In the optical space communication apparatus of the present invention, the receivable angular range of an optical signal (second optical signal) transmitted from the partner apparatus is set to be equal to or smaller than the divergent angle of a light beam (first light beam) to be output from the main apparatus.

Especially, the receivable angular range of the second optical signal is preferably smaller than the divergent angle of the first light beam.

Furthermore, in order to locate the partner apparatus at an optimal position near the center of the transmission light beam, the following automatic tracking control must be done so that the beam spot obtained by focusing the received light beam is located near the center of the photodetector 36.

Figure 3A:
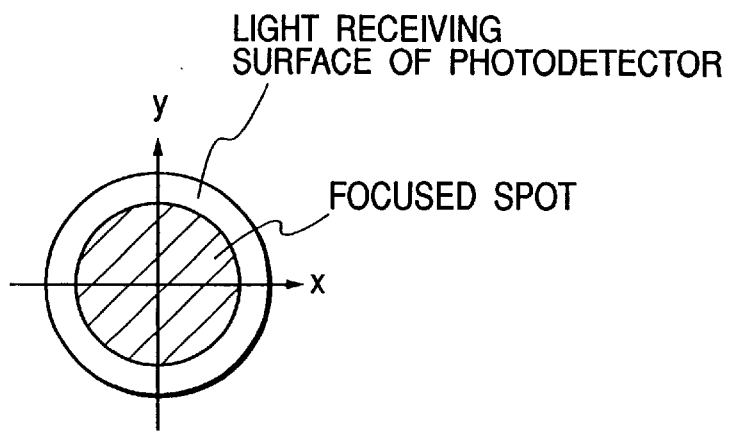
FIGS. 3A and 3B are views for explaining the relationship between the beam spot position on a photodetector and the reception power.
Figure 3B:
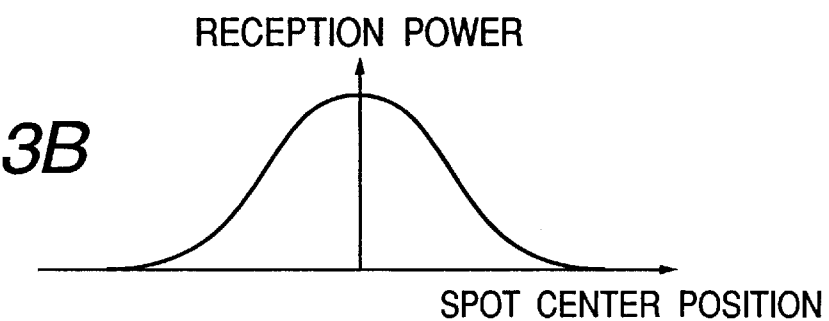

As shown in FIG. 3A, when the received light beam is focused on the light-receiving surface of the photodetector 36, changes in reception power corresponding to the central position of the beam spot are defined by a curve having a central peak, as shown in FIG. 3B. Hence, by controlling the movable mirror 31 to form a beam spot at the position corresponding to the maximum reception power, the direction of the transmission light beam can be simultaneously controlled to an optimal position.

Figure 4:
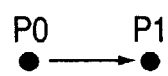
FIG. 4 is an explanatory view of the method of seeking maximum reception power.
Figure 5:
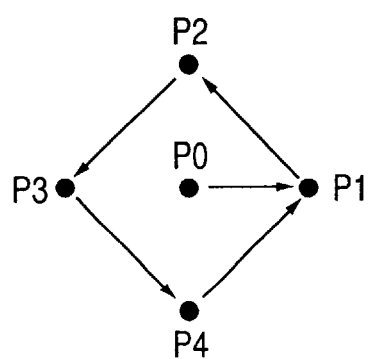
FIG. 5 is an explanatory view of the method of seeking maximum reception power.

FIGS. 4 and 5 are explanatory views of the method of seeking the position of maximum reception power by driving the movable mirror 31. In FIG. 4, P0 represents the current central position of the beam spot, and the beam spot is moved by a small amount in the +x direction to move the central position from P0 to P1. At this time, if the reception power remains the same or increases, P1 is updated as new P0. Conversely, if the reception power decreases as a result of movement, the beam spot is reset to the previous position P0. Such operation is done as one unit, and upon completion of this operation, the same operation is made in another direction (e.g., +y direction). Also, the operation repeats itself in the −x and −y directions. By repeating a series of operations, the beam spot position converges to the maximum reception power position.

FIG. 5 shows another method. The beam spot position is moved in turn to points P1 to P4 around the current position P0, and the reception power is measured at these positions. The beam spot position is then moved to the maximum one of these points to determine a new P0.

Such operations are influenced by variations of reception optical power resulting from fluctuation of air. However, since the same operations always repeat themselves, the influences of variations are averaged so the spot converges near the center. Note that the signals input to the control circuit 42 may be electrically filtered in advance to remove variation components.

Such control method has a low response speed. However, a sufficiently high tracking speed can be assured against large environmental variations such as changes in angle resulting from deflection of the interior of the apparatus, a base that supports the apparatus, a building that holds the base, and the like due to different thermal expansion coefficients upon temperature changes, and bending of a light beam resulting from a nonuniform temperature distribution of air.

Figure 6:
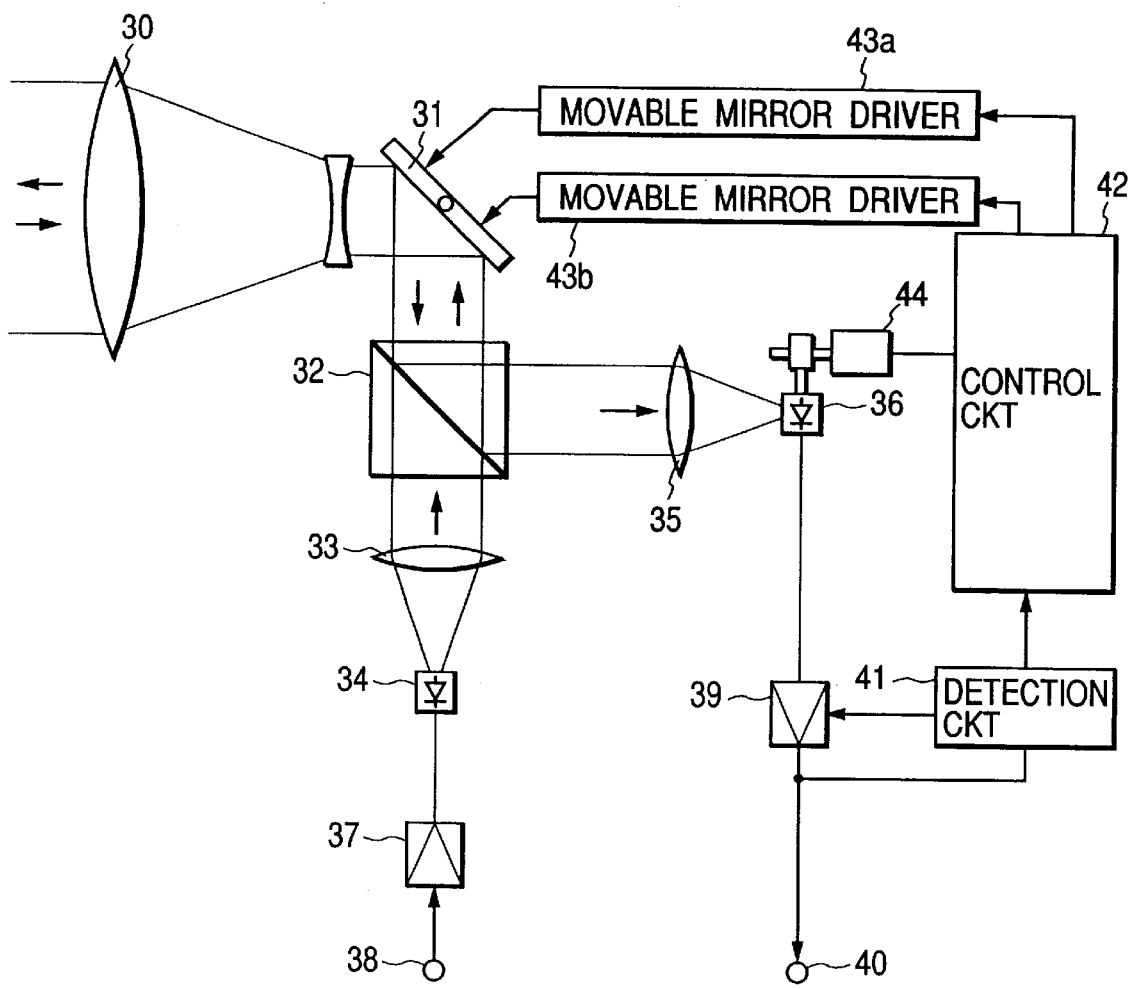
FIG. 6 is a diagram showing the arrangement according to the second embodiment of the present invention.

FIG. 6 shows the arrangement of the second embodiment. In this embodiment, drive means 44 such as a motor or the like is attached to the photodetector 36, so that the photodetector 36 is movable in the optical axis direction of the reception optical system 35 that focuses the received light beam. In the first embodiment, the angular range capable of automatic tracking is relatively narrow since it is nearly equal to the receivable angle of the photodetector 36. However, in this embodiment, since the photodetector 36 is movable in the optical axis direction, the angular range capable of automatic tracking can be broadened.

Figure 7:
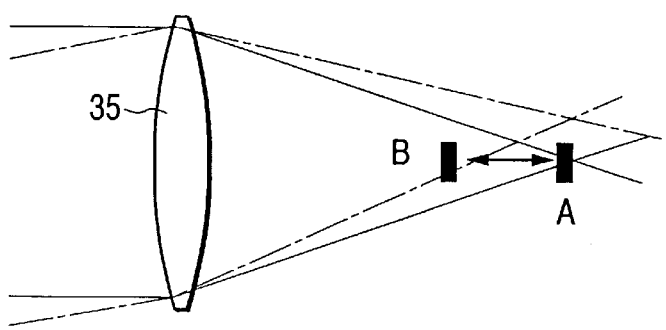
FIG. 7 is an explanatory view of automatic tracking angular range adjustment of a photodetector.

FIG. 7 is an explanatory view of the automatic tracking angular range. Assume that the light-receiving portion of the photodetector 26 is located at a position A, and received light travels in a direction indicated by the dotted line, in a state before adjustment upon installation of the apparatus, or when the apparatus has a tilt as a result of some external force. In such state, since received light does not enter the photodetector 36, automatic tracking is disabled. However, when the photodetector 36 is moved to a position B within the received light, automatic tracking is enabled. After that, the position corresponding to maximum reception power is sought by returning the photodetector 36 in the direction of the position A by a small amount. Finally, received light travels in a normal direction indicated by the solid line, and the photodetector returns to the original position A. Then, automatic tracking is done in the same manner as in the first embodiment.

Figure 8:
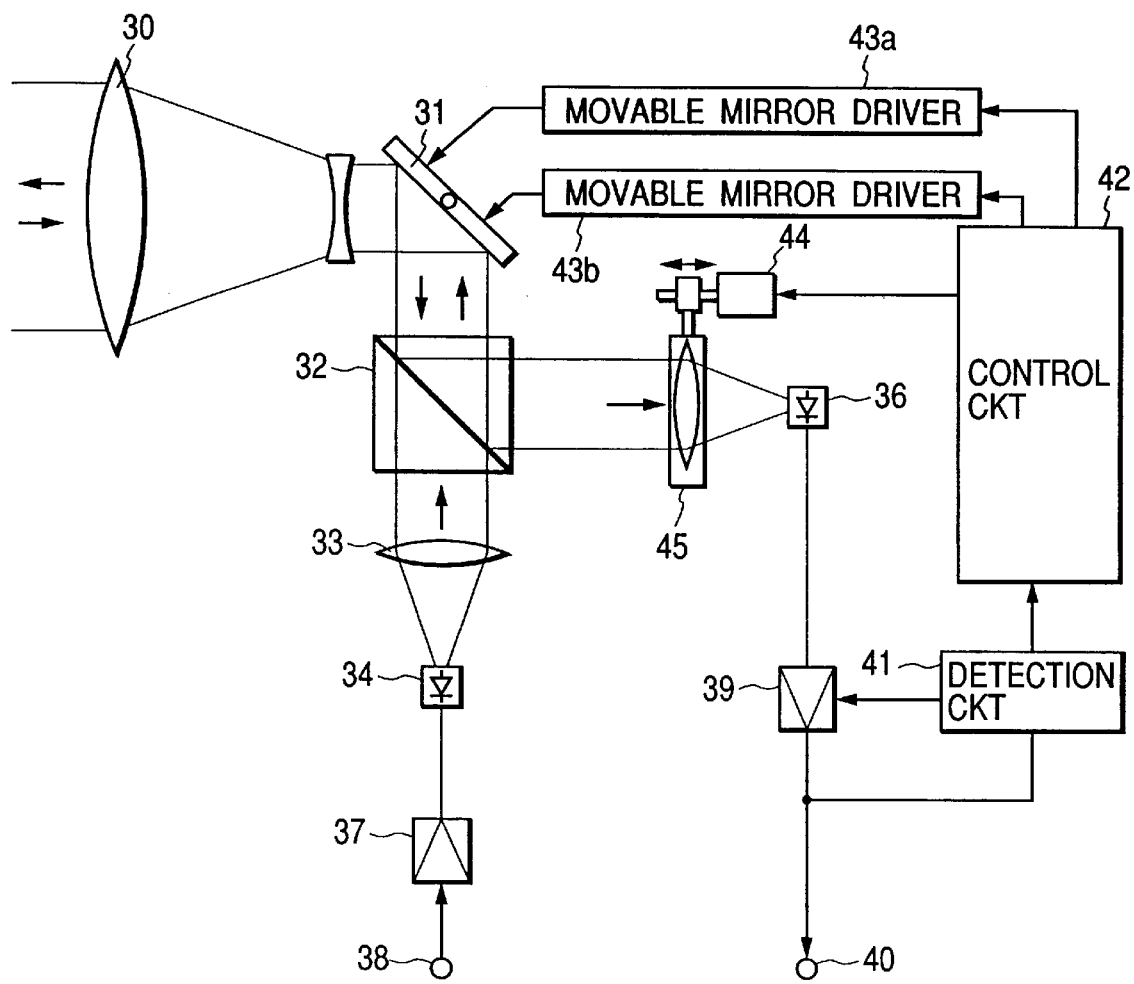
FIG. 8 is a diagram showing the arrangement according to the third embodiment of the present invention.

FIG. 8 shows the arrangement of the third embodiment. In this embodiment, the photodetector 36 is fixed in position, and the drive means 44 is attached to a lens system 45 of the reception optical system for focusing the received light beam. With this arrangement, a function of moving the photodetector from the imaging position of the received light beam by moving the lens system 45 in the optical axis direction can be realized, and the tracking angular range can be broadened in the optical axis direction. In this way, in the third embodiment, the focal point position of the optical system that focuses the received light beam on the photodetector 36 can be movable in the optical axis direction.

Figure 9:
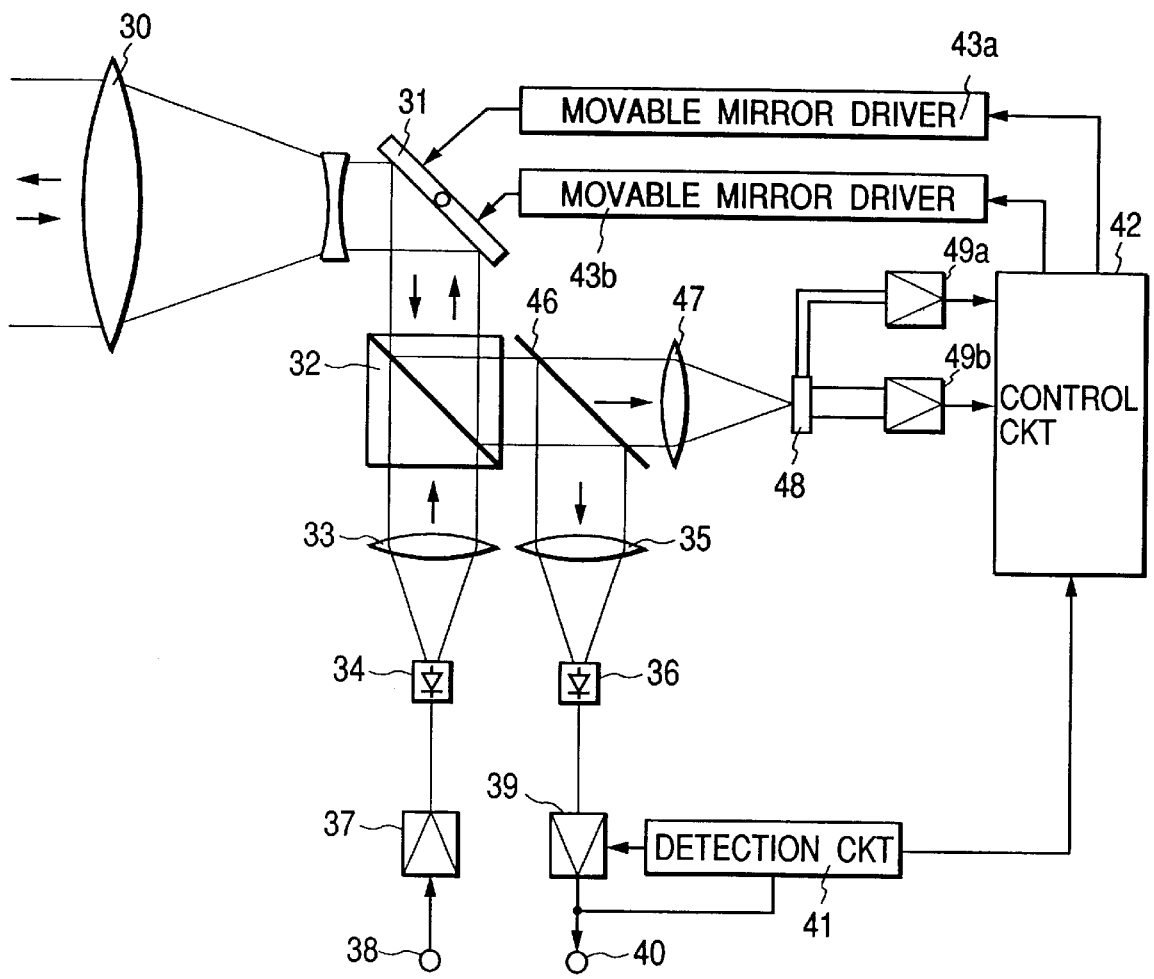
FIG. 9 is a diagram showing the arrangement according to the fourth embodiment of the present invention.

FIG. 9 shows the arrangement of the fourth embodiment. In this embodiment, the angular range capable of automatic tracking is broadened by also using a semiconductor two-dimensional position detector. A beam splitting mirror 46 for splitting a light beam is placed in the reflection direction of the polarization beam splitter 32, and a reception optical system 47 and two-dimensional position detector 48 are placed in the transmission direction of the beam splitting mirror 46. Also, the reception optical system 35 and photodetector 36 are placed in the reflection direction of the beam splitting mirror 46. The output from the two-dimensional position detector is connected to the control circuit 42 via two amplifiers 49a and 49b. Other arrangements are the same as those in the first embodiment.

Some light components of received light are split by the beam splitting mirror 46, and are imaged on the two-dimensional position detector 48. A differential current signal corresponding to the irradiated position of the beam spot on the position detector 48 in the horizontal direction is input to the amplifier 49a, and is converted into a voltage signal representing the beam spot position. The voltage signal is input to the control circuit 42. Also, a differential current signal corresponding to the irradiated position of the beam spot on the position detector 48 in the vertical direction is input to the amplifier 49b, and is similarly input to the control circuit 42 in the form of a voltage signal. The control circuit 42 drives the movable mirror 31 based on these beam spot position signals so that the beam spot is located at the center of the position detector 48.

In this embodiment, the beam splitting mirror 46 is used as in the prior art. However, since this embodiment uses such mirror for the following purpose, neither strict positional precision nor signal precision are required. That is, when the main signal photodetector 36 falls outside the received light beam, the position detector 48 controls to adjust the angle so as to make the received light enter the photodetector 36. After received light is input to the photodetector, tracking is done in the same manner as in the first embodiment.

To restate, neither strict positional adjustment nor a mechanism for maintaining high precision such as a 4-split photodetector are required, and the electric circuitry around the amplifiers 49a and 49b, and the like need not have high precision. Also, the transmitter does not require any special signal source such as a pilot signal generator, and cost can be reduced as compared to the prior art. Hence, the tracking angular range can be broadened by a simple arrangement using the two-dimensional position detector.

Figure 10:
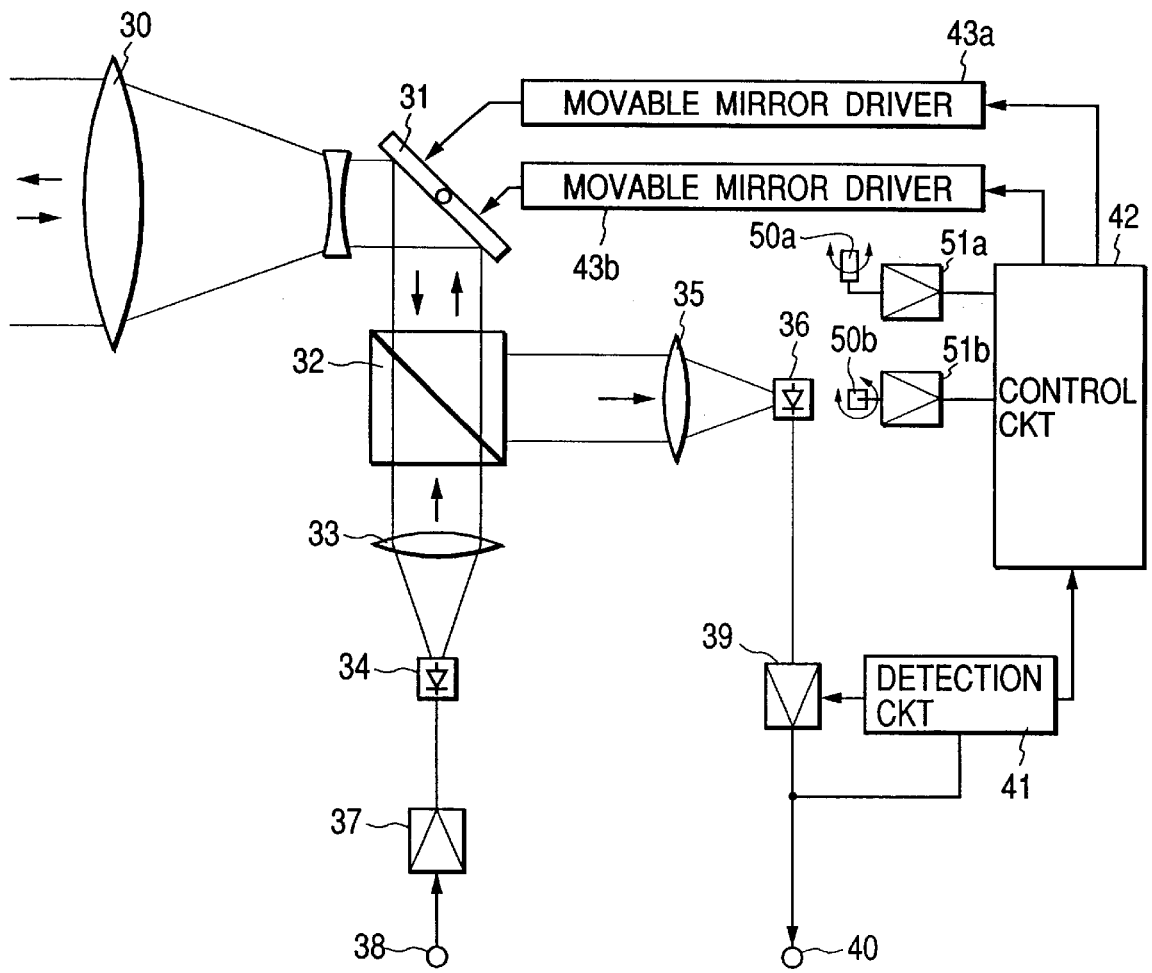
FIG. 10 is a diagram showing the arrangement according to the fifth embodiment of the present invention.

FIG. 10 shows the arrangement of the fifth embodiment. The first to fourth embodiments are effective for slow variations such as deflection of a building, base, and the like, but cannot respond to quick variations resulting from vibrations and the like. Hence, since this embodiment also uses acceleration detectors 50a and 50b, the apparatus can be equipped on an unstable place where vibrations or the like are likely to occur. The acceleration detector 50a for detecting the angular velocity of rotation about the axis parallel to the plane of paper of FIG. 10, and the acceleration detector 50b for detecting the angular velocity of rotation about the axis perpendicular to the plane of paper of FIG. 10 are placed, and their outputs are connected to the control circuit 42 via amplifiers 51a and 51b.

When an angular velocity is produced upon movement of the apparatus, the acceleration detectors 50a and 50b respectively generate signals corresponding to the angular velocities in the respective directions, and these signals are input to the control circuit 42 after being amplified by the amplifiers 51a and 51b. Upon reception of these signals, the control circuit 42 drives the movable mirror 31 to recover the direction of the optical axis. Since the acceleration detectors 50a and 50b have no sensitivity to low-speed movement, automatic tracking for low-speed movement is controlled based on the intensity of the light beam detected by the photodetector 36 as in the first to fourth embodiments, and that for high-speed movement is controlled based on the signals output from the acceleration detectors 50a and 50b.

To recapitulate, in the optical space communication apparatus according to the present invention, since automatic tracking is controlled to maximize the intensity of the detection signal from photodetection means, a low-cost automatic tracking function can be realized.

That is, since the conventional optical space communication apparatus has an automatic tracking function of making the beam spot always hit the center of the 4-split photodetector, its arrangement is complicated and the apparatus is expensive.

By contrast, in the optical space communication apparatus according to the present invention, since the movable mirror, photodetector, and the like are merely moved in a predetermined direction to maximize the intensity of the detection signal from the photodetection means, the arrangement is simple, and the apparatus is inexpensive.

In the optical space communication apparatus of the present invention, the receivable angular range of an optical signal (second optical signal) transmitted from the partner apparatus is set to be equal to or smaller than the divergent angle of a light beam (first light beam) to be output from the own apparatus. As a result, even when the automatic tracking function effects, the light beam transmitted from the own apparatus can surely reach the partner apparatus.

What is claimed is:

1. A communication apparatus to be used in an optical space communication system for performing communication between a plurality of communication apparatuses, comprising:

a light source for emitting a first light beam modulated in accordance with a signal to be transmitted;

a photodetector for receiving a second light beam transmitted from another communication apparatus and outputting a reception signal;

an optical system for transmitting the first light beam emitted from said light source toward another communication apparatus while guiding the second light beam transmitted from another communication apparatus to said photodetector, said optical system focusing the second light beam on said photodetector;

a light deflector for changing a transmission direction of the first light beam and a reception direction of the second light beam, said light deflector changing the reception direction of the second light beam so as to change the position of the light spot incident on said photodetector; and a control circuit for controlling said light deflector depending on the output of said photodetector such that the light spot incident on a first position of said photodetector is shifted to a second position and kept at the second position if the output of said photodetector is increased or unchanged by shifting the light spot, but returned to the first position if the output of said photodetector is decreased by shifting the light spot.

2. A communication apparatus according to claim 1, wherein the receivable angular range of the second light beam is not more than a divergent angle of the first light beam to be transmitted.

3. A communication apparatus according to claim 1, further comprising means for moving said photodetector in an optical axis direction of said optical system.

4. A communication apparatus according to claim 1, wherein said optical system includes a lens for focusing the second light beam on said photodetector and said apparatus further comprises means for moving the lens in an optical axis direction of said optical system.

5. An optical space communication system comprising a plurality of communication apparatuses according to any of claims 1 through 4, for performing communication between the apparatuses.

6. A method of changing transmission and reception directions of a light beam in a communication apparatus to be used in an optical space communication system for performing communication between a plurality of communication apparatuses, the communication apparatus comprising a light source for emitting a first light beam modulated in accordance with a signal to be transmitted; a photodetector for receiving a second light beam transmitted from another communication apparatus and outputting a reception signal; an optical system for transmitting the first light beam emitted from the light source toward another communication apparatus while guiding the second light beam transmitted from another communication apparatus to the photodetector, the optical system focusing the second light beam on the photodetector; a light deflector for changing a transmission direction of the first light beam and a reception direction of the second light beam, the light deflector changing the reception direction of the second light beam so as to change the position of the light spot incident on the photodetector; and a control circuit for controlling the light deflector depending on the output of the photodetector such that the light spot incident on a first position of the photodetector is shifted to a second position and kept at the second position if the output of the photodetector is increased or unchanged by shifting the light spot, but returned to the first position if the output of the photodetector is decreased by shifting the light spot, said method comprising steps of:

shifting a light spot incident on the first position of the photodetector to the second position by moving the light deflector using the control circuit; and keeping the light spot at the second position if the output of the photodetector is increased or unchanged by shifting the light spot, but returning the light spot to the first position if the output of the photodetector is decreased by shifting the light spot.

* * * * *

UNITED STATES PATENT AND TRADEMARK OFFICE
CERTIFICATE OF CORRECTION

PATENT NO.   : 6,335,811 B1
DATED        : January 1, 2002
INVENTOR(S)  : Tetsuo Sakanaka It is certified that error appears in the above-identified patent and that said Letters Patent is hereby corrected as shown below:

Column 2,
Line 61, "comprises" should read -- comprising --.

Column 3,
Line 61, "drivers 32a and 32b" should read -- drivers 43a and 43b. --.

Column 5,
Line 53, "photodetector 26" should read -- photodetector 36 --.

Column 7,
Line 45, "own" should read -- main --; and
Line 46, "effects," should read -- is effected, --; and "own" should read -- main --.

Signed and Sealed this

Eighth Day of October, 2002

Attest:

Attesting Officer

JAMES E. ROGAN
*Director of the United States Patent and Trademark Office*